United States Patent [19]

Davis

[11] 3,998,291
[45] Dec. 21, 1976

[54] AUTOMOTIVE SAFETY SEAT

[76] Inventor: Edwin George Davis, 2116 Cedar Run Drive, Camp Hill, Pa. 17011

[22] Filed: Aug. 6, 1975

[21] Appl. No.: 602,285

[52] U.S. Cl. .............................. 180/91; 180/103 A; 280/748; 296/65 A; 297/216
[51] Int. Cl.² .......................................... B60R 21/10
[58] Field of Search ......... 180/103 A, 103 R, 82 R, 180/91; 296/65 A; 297/216; 280/748

[56] References Cited

UNITED STATES PATENTS

| | | | |
|---|---|---|---|
| 2,102,979 | 12/1937 | Smith | 297/216 |
| 2,270,172 | 1/1942 | Ruegger | 297/216 |
| 2,735,476 | 2/1956 | Fieber | 296/65 A X |
| 2,818,909 | 1/1958 | Burnett | 297/216 |
| 2,823,730 | 2/1958 | Lawrence | 296/65 A X |
| 2,922,461 | 1/1960 | Braun | 297/216 |
| 3,357,736 | 12/1967 | McCarthy | 297/216 X |
| 3,463,543 | 8/1969 | Zellar | 297/216 |
| 3,610,679 | 10/1971 | Amato | 296/65 A |
| 3,731,972 | 5/1973 | McConnell | 297/216 |
| 3,858,930 | 1/1975 | Calandra | 296/65 A |

FOREIGN PATENTS OR APPLICATIONS

| | | | |
|---|---|---|---|
| 537,159 | 4/1955 | Belgium | 296/65 A |
| 40,667 | 8/1929 | Denmark | 180/91 |
| 830,902 | 2/1952 | Germany | 297/216 |
| 1,430,028 | 3/1969 | Germany | 296/65 A |

Primary Examiner—Joseph F. Peters
Assistant Examiner—John P. Silverstrim
Attorney, Agent, or Firm—Thomas Hooker

[57] ABSTRACT

A safety device for motor vehicles whereby protection is provided in the event of collision by rotating or tilting the seat rearwardly thus placing the passenger in a safe position. Energy absorption devices slow forward movement of the seat following impact.

5 Claims, 5 Drawing Figures

AUTOMOTIVE SAFETY SEAT

This invention relates to an automotive safety device for use in vehicles having passenger seats therein to protect the passengers against injuries resulting from involuntary impact with the dash, windshield, and the like.

Grave concern has been expressed over the increase in fatalities and injuries attributable to the use of various vehicular means of transportation, particularly automobiles. Of particular concern is the secondary impact received by the passenger resulting from the traumatic contact with the dash, steering column, safety glass, and forwardly located portions of the automotive passenger compartments. The secondary impact usually occurs on collision with an object, resulting in excessive deceleration of the vehicle. Initial forces move the passenger forward to collide with the comparatively solid portions of the slowed vehicle. Such injuries are quite dangerous since they usually occur in and about the head of the passenger and further include the danger of substantial chest and thoracic injuries to the driver seated behind the steering column. Substantial harm can result from secondary impact causing severe injury or death.

The utilization of restraints such as seat belts has tended to lessen injuries to passengers generally. Seat belts currently in use are effective in restricting forward movement of the legs, but they may not effectively restrain the upper portions of the body from pivoting forward and striking the interior of the vehicle with the risk of injury to the head and chest.

Accordingly, it is an object of the invention to provide an automotive safety device which in the event of an accident automatically tilts or inclines the seat backwardly so that the passenger is pressed against the base of the seat in the tilted or inclined position and is not pivoted forward and in which the passenger and seat are smoothly slowed after impact.

Other objects and features of the invention will become apparent as the description proceeds, especially when taken in conjunction with the accompanying drawings illustrating the invention, of which there is one sheet.

Figure 1:
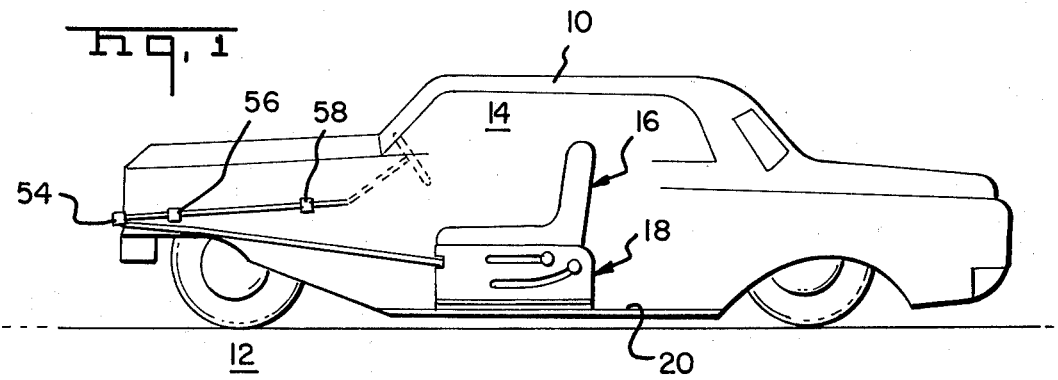
FIG. 1 is a schematic representation of the passenger compartment of an automotive vehicle with the present invention installed therein.
Figures 2, 3:
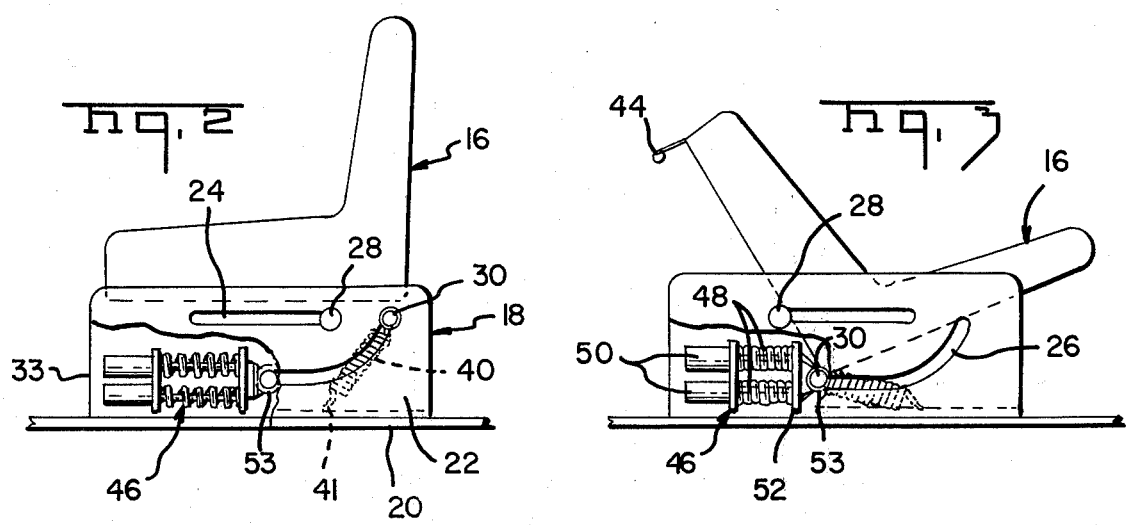
FIG. 2 is a side view of the passenger seat in the automotive vehicle of FIG. 1, partially broken away.
FIG. 3 is a view similar to FIG. 2, but showing the seat following rearward rotation.
Figures 4, 5:
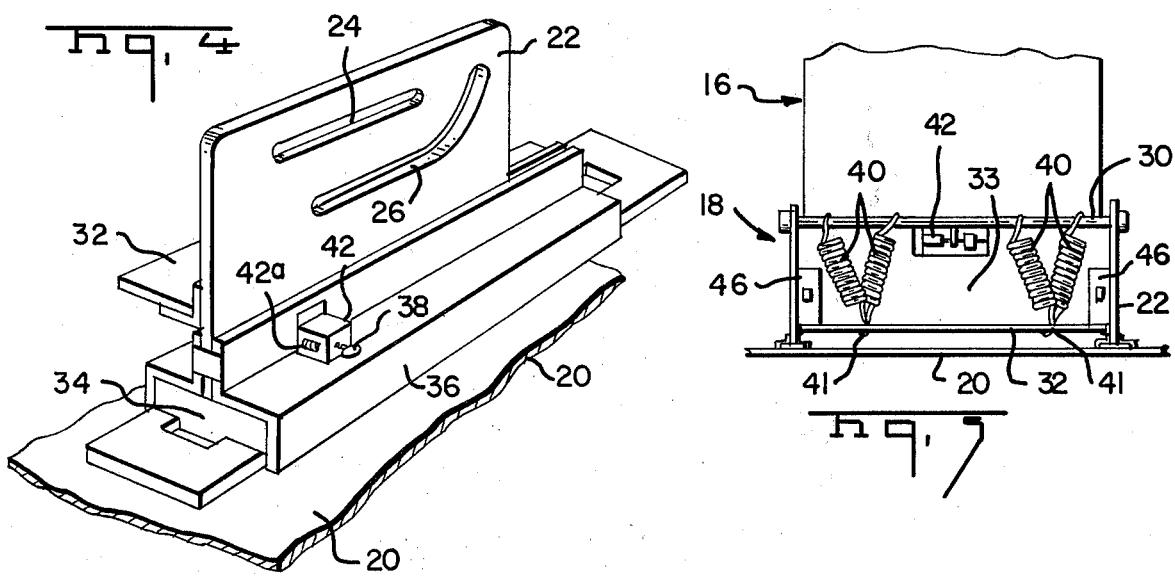
FIG. 4 is a view of one support for the seat which permits forward and rearward adjustment of the seat.
FIG. 5 is a rear view of the passenger seat.

In FIG. 1, automobile 10 rests on surface 12 and includes a passenger compartment 14 having a safety seat 16 in accordance with the invention. The seat may be of the "slab" or "bucket" type. The seat 16 rests on base 18 which is secured to the floor 20 of automobile 10. The base 18 includes a pair of support plates 22, each including upper and lower slots 24 and 26 as shown in FIG. 4. Slot 24 extends along the top of each plate 22 in a direction parallel to direction of travel of automobile 10. The front end of slot 26 is located below and slightly behind the front end of slot 24. The slot extends rearwardly and past the rear end of slot 24 and then curves up to the level of slot 24 a distance behind the rear end of slot 24 so that the rear end of slot 26 is located at the same level as slot 24. Support rods 28 and 30 are carried by seat 16 and extend through the slots 24 and 26 respectively in both plates. The rods are headed outwardly of the plates to assure that they are retained in the slots during the motion of the seat from the position of FIG. 2 to the position of FIG. 3.

The base 18 includes a plate 32 extending between support plates 22 and a front plate 33. As illustrated in FIG. 4, the support plates 32 each are secured to a lower slide 34 confined for forward and rearward movement in guide 36 secured to the floor 20 of the automobile. The seat and base may be moved toward or away from the steering wheel and then locked in a desired position by manually removable spring backed pins 38 carried on guides 36. The pins engage locking recesses (not illustrated) in the support plates 22.

A number of coiled springs 40 extend between permanent mountings 41 on plate 32 and rod 30. In the position illustrated in FIGS. 2 and 5, the springs 40 are under tension and bias the rod 30 for movement along slots 26. Rotation of the seat by springs 40 is prevented by closed release mechanism 42 on the front plate 33. The release mechanism includes a pin normally extending through keeper 44 carried on the front of seat 16 such that the pin prevents the springs 40 from rotating the seat in a rearward direction about rod 28.

Energy absorbing units 46 are located on the inner front surfaces of plates 22 and includes springs 48 and hydraulic dampers 50 mounted on the plates with the free ends of the springs and piston rods of the dampers secured to a strike plate 52 located in the path of movement of rod 30 along slots 26. The striking plates include rod-locking members 53 normally located a distance from the forward end of the adjacent slots 26.

A sensor 54 is mounted on the front of automobile 10 and is powered by battery 56 to emit a signal upon front end collision to engine cut off 58 and release mechanism 42. The signal from sensor 52 ignites an explosive charge in release mechanism 42 to withdraw the pin from keeper 44, thereby permitting springs 40 to move the rod 30 along slot 26 and rotate the seat rearwardly about rod 28. At the same time, the inertia of the seat and of the passenger occupying it carries the seat forward with respect to the plates 22 and moves the rods forward along slots 24 and 26. As rod 30 passes permanent mountings 41 and engages and is locked to strike plates 52 by members 53, further forward movement of the seat is resisted by springs 40 and 48, which are elongated and shortened respectively by forward movement of the rod, and by the hydraulic dampers 50. The restraining force of the springs and dampers smoothly slows the forward movement of the seat so that the seat and occupant are safely slowed. The dampers prevent excessive rebound.

From the foregoing detailed description of the operation of the invention, it will be seen that immediately upon the front end impact the sensor 54 frees the release mechanism to permit springs 40 to rotate the seat 16 in a backward direction, thereby placing the occupant in a reclining position in which the upper body is less likely to be subjected to forward inertial pivoting. When rod 30 passes mounting 41 and engages plate 52, the springs 40 and 48 and dampers 50 cooperate to restrain further forward movement of the seat and passenger with respect to the automobile, thereby slowing and cushioning the passenger. The dampers prevent whiplash-type accidents because of spring rebound. If desired, energy absorbing units may be provided for rod 28 so that the rod would engage these units following the pivoting of the seat and aid in slowing the seat.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A safety device for a vehicle comprising a base mounted to the vehicle; first and second guide means on said base, said first guide means extending a distance along the base in the direction of travel of the vehicle, the second guide means being located below the first guide means and extending rearwardly beyond the end of the first guide means and then upwardly to an end at the same level as the first guide means; a seat in the vehicle mounted on the base and including a first member engagable with said first guide means for movement there along and a second member engagable with said second guide means for movement there along, said members being located at the ends of said guide means when the seat is in the normal position in the vehicle; a release member between said seat and base for securing the seat in said normal position; a spring extending between said seat and base normally biasing said seat so that when the release member is opened the second member moves along said second guide means away from its end; an energy absorbing unit on the base in the path of movement of the second member along the second guide means; and a sensor at the front of the vehicle operable to open said release member upon front end impact whereby said spring moves said second member along said second guide means to rotate the seat rearwardly and, with further movement of said second member, cooperates with said energy absorbing unit to slow forward movement of the seat.

2. A safety device as in claim 1 wherein the base includes a pair of vertically extending plates, said first and second guide means comprise slots extending through said plates and said first and second members extend through their respective slots.

3. A safety device as in claim 2, including an energy absorbing unit on each of said plates, each such unit including a spring and a hydraulic damper each secured to a plate at one end and a strike plate secured to the free ends of the damper and spring, the strike plate including an engagement surface positioned in the path of movement of second members.

4. A safety device as in claim 3 wherein the connection between said spring and said base is located below said second slots a distance away from the other ends of such slots so that the spring cooperates with the energy absorbing units in slowing forward movement of the seat.

5. A safety device as in claim 1 wherein the absorbing unit includes clasp means engagable with said second member so that the energy absorbing unit limits rebound of the seat.

* * * * *